3,073,054
FISHING LURE
Walter A. Sherwood, 19 Foster Place, Hempstead, N.Y.
Filed Feb. 1, 1962, Ser. No. 170,392
12 Claims. (Cl. 43—17.1)

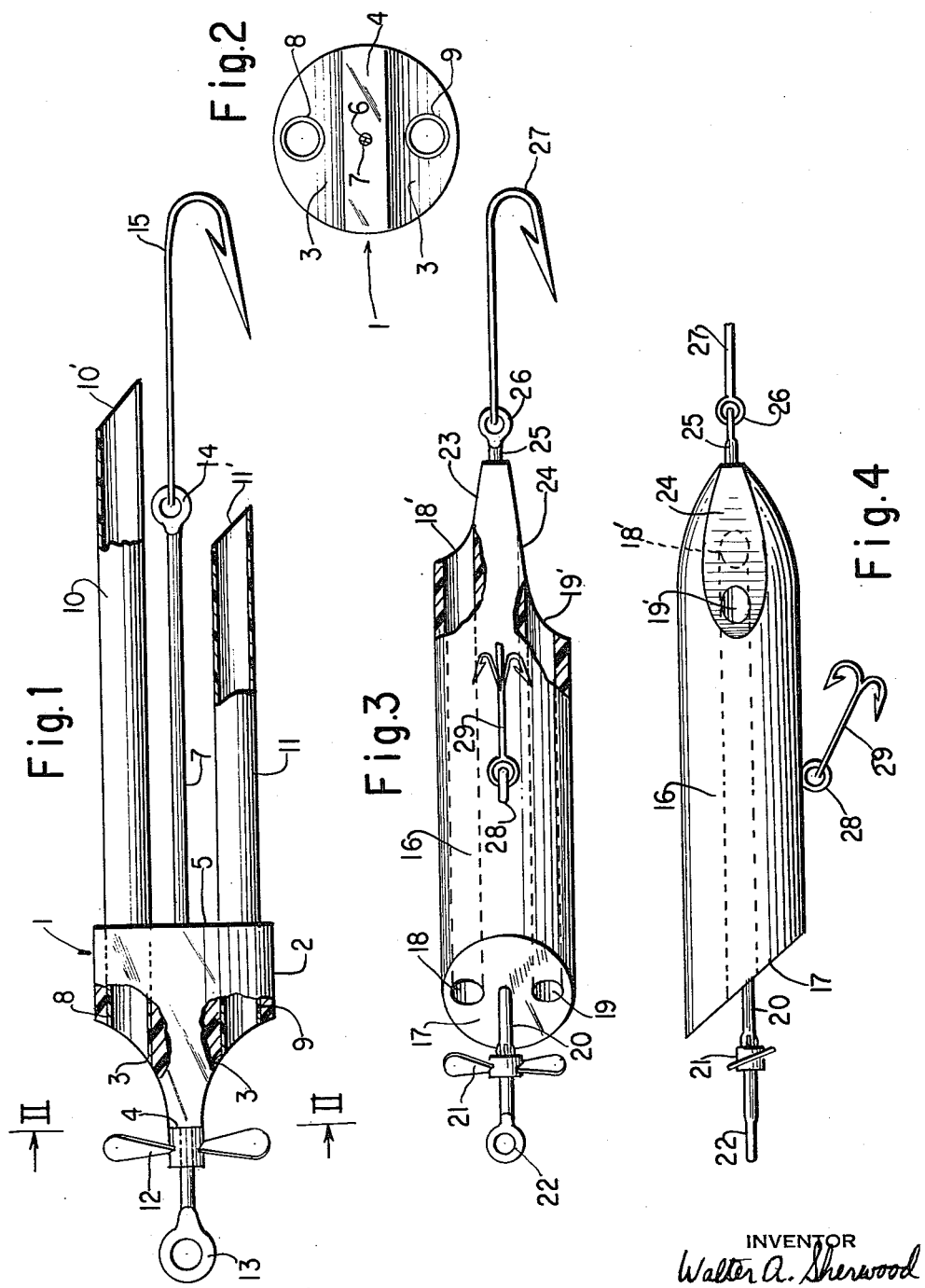

This invention relates to fishing lures, and more particularly to such a lure which is adapted to produce vibrations in the ambient water which can be "heard" by fish.

It is an object of the present invention to provide a lure so constructed that its motion relative to the water will set up vibrations of a character and frequency designed to attract fish to the lure.

It is a further object to provide such a lure of simple construction, without complex separate moving parts.

It is another object to provide certain improvements in the form, construction and arrangement of the elements whereby the above named and other objects may effectively be attained.

Since it is known that fish exhibit certain responses to vibrations of the water in the nature of sound waves, it will be assumed for the purposes of this description that fish can "hear" the sounds corresponding to such waves and that such sounds may be called "audible."

Practical embodiments of the invention are shown in the accompanying drawings, wherein:

FIG. 1 represents a side elevation of the complete lure, parts being broken away and shown in section;

FIG. 2 represents a transverse section on the line II—II of FIG. 1;

FIG. 3 represents a side elevation of a modified form of the lure, parts being broken away and shown in section, and FIG. 4 represents a side elevation of the lure shown in FIG. 3, rotated 90° on its longitudinal axis.

Referring to the drawings, the lure is shown in FIGS. 1 and 2 as comprising a head 1, which may suitably be of a molded acrylic plastic such as "Lucite," having a cylindrical outer surface 2, concave tapered front end surfaces 3, 3 separated at the front by a narrow flat surface 4, and a flat circular rear surface 5 bounded by the rear edge of the cylindrical surface 2. The head 1 is traversed by an axial bore 6 to receive the fixed hook shank 7, normally of metal, and the head is traversed also by larger bores 8, 9 extending from the surfaces 3, 3 to the surface 5 along axes parallel to the bore 6.

In one of the bores (e.g., 8) there is fitted and secured a piece of somewhat flexible tubing 10, such as rubber surgical tubing, having its front end matching the contour of the surface 3, and its rear end 10' cut at an angle of about 45°. In the other bore, 9, there is similarly fitted a tube 11, of the same character but shorter, and also having its rear end 11' cut at a 45° angle. Suitable dimensions for the tubes are:

|  | Inches |
|---|---|
| I. D. (lumen) | .25 |
| Wall thickness | .04687 |
| Length, tube 8 | 4.300±.2 |
| Length, tube 11 | 3.282±.2 |

The tube lengths are measured approximately on the longitudinal axis of each tube.

On the forwardly projecting part of the shank 7 is journaled a small 2-bladed spinner 12 having a diameter such that its path at least cuts the axes of the tubes, considered as forwardly projected, and the front end of the shank terminates in an eye 13 or other suitable configuration for attachment to a fishing line or leader. At its rear end the shank is also provided with an eye 14 or the like, between the ends of the tubes 10 and 11, for engagement, permanently or detachably, with the shank end of a fish-hook 15 which can be single, as shown, or treble if desired. The hook 15 and shank 7 could be integral, instead of jointed through the eye 14, and the spinner could be of the single blade type, as possible detail variations.

In the modified form shown in FIGS. 3 and 4 the head and tubes are molded integrally from a single cylindrical block of plastic, preferably one having a density approximately equal to that of water. The front end 17 of the block is beveled at about a 45° angle and the front openings of the tubular passages 18, 19 are located symmetrically each side of the front stub shaft 20 which is fixed to the block, carries a spinner 21 as before and terminates in an eye 22, or the like. The rear end of the block 16 is shown as being somewhat torpedo-shaped with a concave tapering surface 23 determining the location of the rear end 18' of the passage 18, and a longer, more forwardly extending concave tapering surface 24 determining the location of the rear end 19' of the passage 19. Since the passages 18 and 19 have their front ends even, in the plane of the end surface 17, it will be seen that the difference in shape and location of the surfaces 23 and 24 results in the passages having different lengths, which can be exactly as specified in reference to the tubes 10 and 11.

A short rear shaft 25 with an eye 26 or the like serves for mounting of a hook 27 (single or treble) and an eye 28 in one side of the block can be provided, if desired, for the mounting of an additional treble hook 29.

The configuration of the head, in each case, is calculated to deflect the water stream (when the lure is used in a normal manner as by trolling or by casting and retrieving at 2 to 3 ft./sec.) past the open front ends of the tubes, thereby setting the water in them vibrating with frequencies which are a function of the tube length. The vibrations are sonic, those from the longer tubes 10 or 18 having a frequency of approximately 7000 cycles/sec. and those from the shorter tube having a frequency of approximately 9000 cycles/sec. These frequencies have been found to produce good results, and it seems probable that the beat frequency of 2000 cycles may also be effective in attracting certain game fish. The spinner superimposes a flutter of about 30 to 50 cycles/sec. which beats with (and chops) the tube vibrations and their beat to simulate the vibrations caused by tail and fin movements of certain smaller bait fish. While the best results have been obtained by the use of the proportions set forth, it will be understood that certain variations are contemplated, within the scope of the invention.

What I claim is:

1. A vibration emitting fishing lure comprising, a unitary body defining two longitudinally extending passages of different lengths and open at both ends and means for causing water to pass across and into the front ends of said passages in such a manner as to set up vibrations in said tubes.

2. A lure according to claim 1 in which said vibrations are sonic.

3. A lure according to claim 1 in which said vibrations are in the frequency range of approximately 7000 cycles/sec. to approximately 9000 cycles/sec.

4. A lure according to claim 3 in which the vibrations of one tube are approximately 7000 cycles/sec. and those of the other tube are approximately 9000 cycles/sec.

5. A lure according to claim 1 which includes a spinner at its front end having at least one blade so positioned as to rotate adjacent the front ends of the passages and to impose on the vibrations of said tubes a flutter having a frequency which is a function of the rate of rotation of the spinner.

6. A vibration emitting fishing lure comprising a head having a cylindrical side surface, inclined front surfaces and a flat transverse rear surface, the head being traversed by bores extending from the front surface to the rear surface, and tubes having their front portions fixed in said bores, respectively, to constitute a unitary body and having their rear portions extending rearward beyond the rear surface of the head.

7. A lure according to claim 6 in which the front ends of the tubes terminate in the inclined front surfaces of the head.

8. A lure according to claim 7 in which the inclined front surfaces are concave.

9. A lure according to claim 7 in which the tubes are of different lengths.

10. A vibration emitting fishing lure comprising, an elongated cylindrical body having a slanting front end surface and two inclined rear end surfaces, the body being traversed by two bores extending from the front end surface to each of said rear end surfaces, respectively, said surfaces and said bores being so disposed that one bore is longer than the other bore.

11. A lure according to claim 10 in which one inclined rear end surface is shorter than the other inclined rear end surface, the longer bore intersecting the shorter surface and the shorter bore intersecting the longer surface.

12. A lure according to claim 11 in which the inclined rear end surfaces are concave.

References Cited in the file of this patent
UNITED STATES PATENTS

| | | |
|---|---|---|
| 1,453,987 | Mills | May 1, 1923 |
| 1,854,696 | Herington | Apr. 19, 1932 |
| 2,748,522 | Mulcahey | June 5, 1956 |

UNITED STATES PATENT OFFICE

CERTIFICATE OF CORRECTION

Patent No. 3,073,054                                                January 15, 1963

Walter A. Sherwood

It is hereby certified that error appears in the above numbered patent requiring correction and that the said Letters Patent should read as corrected below.

In the grant, line 4, for "Hampstead" read -- Hempstead --; column 1, line 60, for "8" read -- 10 --.

Signed and sealed this 24th day of September 1963.

(SEAL)
Attest:

ERNEST W. SWIDER                                                            DAVID L. LADD
Attesting Officer                                                           Commissioner of Patents